(12) United States Patent
Liu

(10) Patent No.: US 8,310,450 B2
(45) Date of Patent: Nov. 13, 2012

(54) COMPUTER INPUT APPARATUS

(75) Inventor: Xing-Cheng Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 716 days.

(21) Appl. No.: 12/507,026

(22) Filed: Jul. 21, 2009

(65) Prior Publication Data

US 2010/0073296 A1 Mar. 25, 2010

(30) Foreign Application Priority Data

Sep. 19, 2008 (CN) .......................... 2008 1 0304580

(51) Int. Cl.
*G06F 3/02* (2006.01)
*G09G 5/00* (2006.01)

(52) U.S. Cl. ....................................... 345/168; 345/156

(58) Field of Classification Search .................. 345/156, 345/157, 163, 168, 169; 455/566, 550.1, 455/556.1, 556, 2
See application file for complete search history.

(56) References Cited

U.S. PATENT DOCUMENTS

| | | | |
|---|---|---|---|
| D320,197 S * | 9/1991 | Weber .......................... D14/406 |
| 5,189,632 A * | 2/1993 | Paajanen et al. .............. 708/109 |
| 5,526,411 A * | 6/1996 | Krieter ..................... 379/110.01 |
| 5,706,031 A * | 1/1998 | Brendzel et al. .............. 345/172 |
| 5,719,936 A * | 2/1998 | Hillenmayer ................. 379/447 |
| 5,943,625 A * | 8/1999 | Yeom et al. ................... 455/557 |
| D413,885 S * | 9/1999 | Irimajiri et al. .............. D14/144 |
| D424,549 S * | 5/2000 | Choi ............................ D14/406 |
| 6,285,354 B1 * | 9/2001 | Revis ............................ 345/163 |
| 6,711,474 B1 * | 3/2004 | Treyz et al. ....................... 701/1 |
| 6,868,145 B1 * | 3/2005 | Nelson ...................... 379/93.09 |
| D545,822 S * | 7/2007 | Murakami .................. D14/407 |
| 7,366,540 B2 * | 4/2008 | Ansari et al. ............... 455/556.1 |
| 7,440,770 B2 * | 10/2008 | Miyashita ................. 455/550.1 |
| 7,505,798 B2 * | 3/2009 | Hofer et al. ................ 455/575.1 |
| 7,525,533 B2 * | 4/2009 | Shibuya et al. .............. 345/163 |
| D624,520 S * | 9/2010 | Nishikawa ............ D14/138 AB |
| D625,284 S * | 10/2010 | Cha ........................ D14/138 AB |
| 8,162,552 B2 * | 4/2012 | Rak et al. ....................... 400/490 |
| 2005/0007343 A1 * | 1/2005 | Butzer .......................... 345/163 |
| 2007/0139380 A1 * | 6/2007 | Huang .......................... 345/166 |
| 2008/0080919 A1 * | 4/2008 | Rak et al. ...................... 400/486 |
| 2009/0128370 A1 * | 5/2009 | Hofer et al. ..................... 341/22 |
| 2009/0319694 A1 * | 12/2009 | Slezak et al. ................... 710/10 |
| 2010/0225591 A1 * | 9/2010 | Macfarlane ................... 345/169 |

FOREIGN PATENT DOCUMENTS

| CN | 201000614 | 1/2008 |
|---|---|---|
| EP | 1681836 A1 * | 7/2006 |

* cited by examiner

*Primary Examiner* — Ricardo L Osorio
(74) *Attorney, Agent, or Firm* — Altis Law Group, Inc.

(57) ABSTRACT

A computer input apparatus includes a keyboard and a mouse. The keyboard includes a housing, a number of input keys, and a telephone module for responding to a call or initiating a call according to a user's input. The input keys include standard keyboard keys and standard telephone keys. The mouse includes a main body, a number of buttons mounted on the main body, and a motion detecting unit for detecting motion of the mouse. The main body includes a mouse speaker configured for converting electrical signals into sound and a mouse microphone configured for converting sound into electrical signals. The buttons include a number of standard mouse buttons and an enable telephone button configured for enabling a telephone function of the mouse to answer a call.

12 Claims, 4 Drawing Sheets

COMPUTER INPUT APPARATUS

BACKGROUND

1. Technical Field

The present disclosure relates to input apparatuses, and particularly, relates to a computer input apparatus.

2. Description of Related Art

Nowadays, computers connected to the Internet or to the telephone network are able to hold remote real-time conferences. Most computers equipped to make remote real-time conference calls typically include a host unit, a keyboard, a mouse, a display, speakers, and a microphone. In use, the keyboard, the mouse, the speakers, the microphone, and the display are commonly placed on a conference table, using up a lot of real estate on the table. In addition, connecting and disconnecting, as needed, the speakers and the microphone is an inconvenience.

What is needed, therefore, is a computer input apparatus to overcome the above mentioned problems.

DETAILED DESCRIPTION

Figure 1:
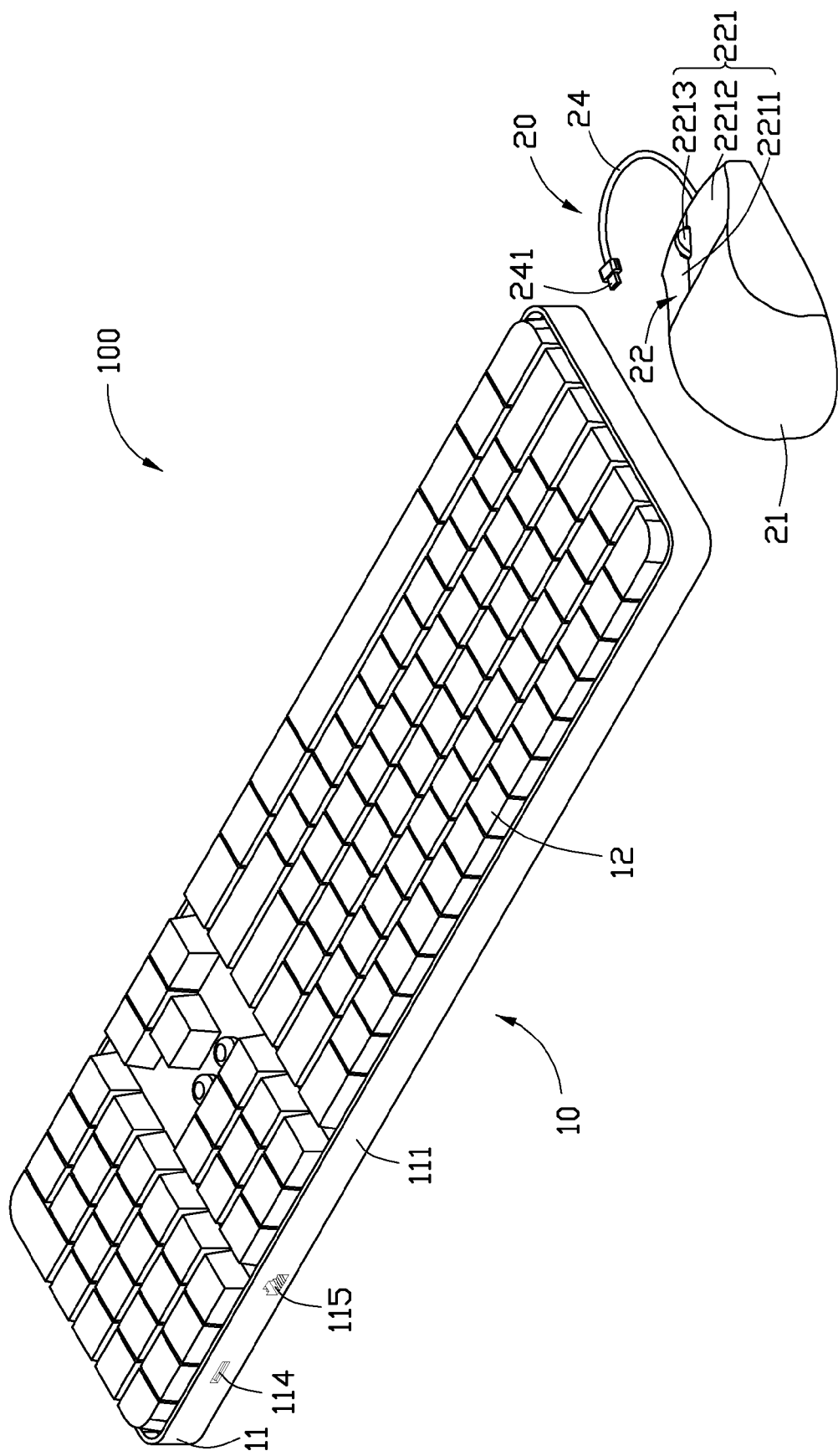
FIG. 1 is an isometric schematic view of a computer input apparatus, according to an exemplary embodiment of the disclosure.

Referring to FIG. 1, an isometric view of a computer input apparatus 100, according to an exemplary embodiment, is shown. The computer input apparatus 100 includes a keyboard 10 and a mouse 20.

The keyboard 10 includes a housing 11 and a number of input keys 12 arranged on the housing 11.

Figure 2:
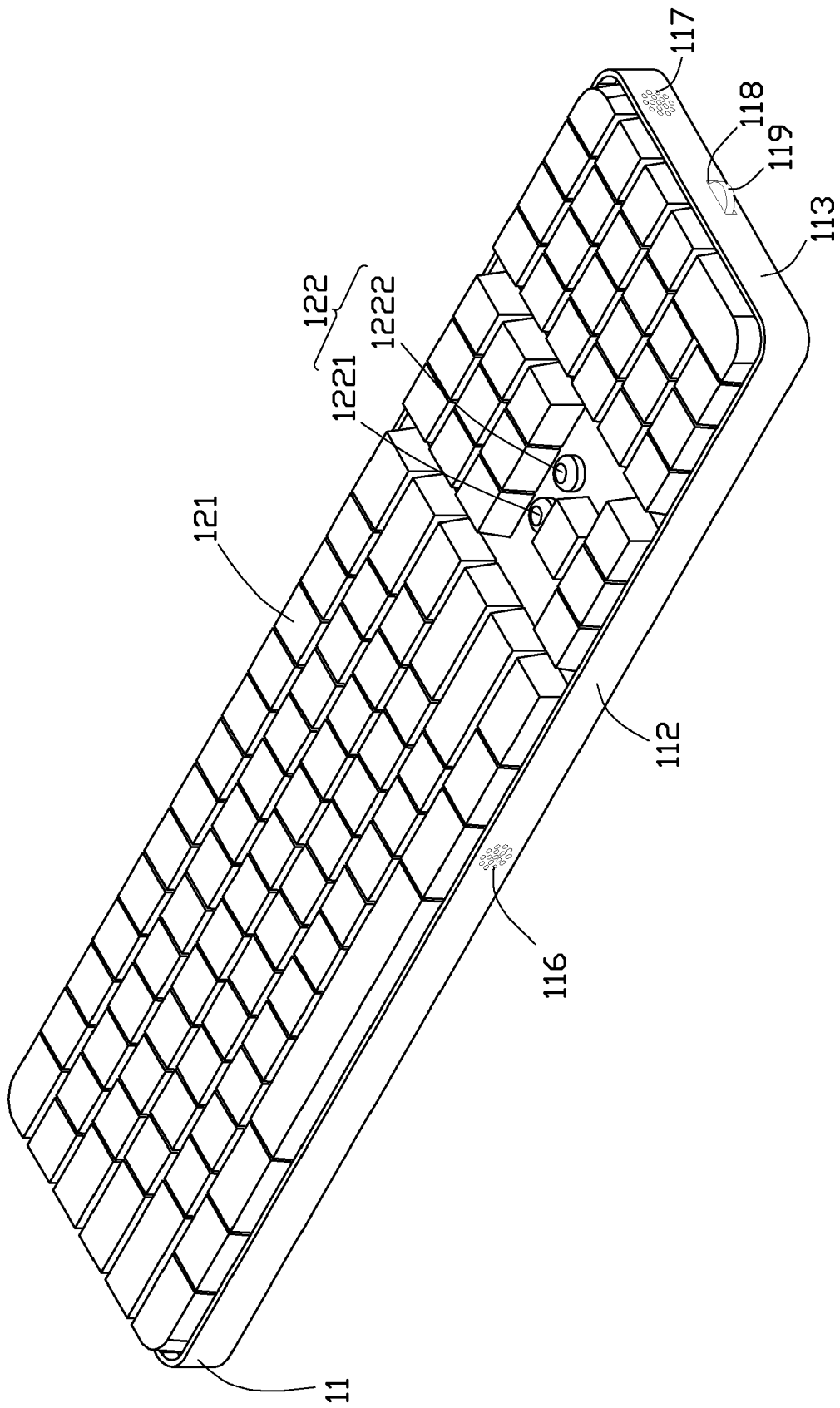
FIG. 2 is a keyboard of the computer input apparatus of FIG. 1, but viewed at another angle.

Referring also to FIG. 2, the housing 11 includes a first side surface 111, a second side surface 112 parallel to the first side surface 111, and a third side surface 113 connecting the first side surface 111 and the second surface 112. The housing 11 defines a universal serial bus (USB) connector 114 and a telephone connector 115 in the first side surface 111. The housing 11 also defines a number of microphone sound holes 116 in the second side surface 112. Furthermore, the housing 11 defines a number of speaker sound holes 117 and a rectangular opening 118 in the third side surface 113. The housing 11 includes a volume knob 119 rotatably positioned in the rectangular opening 118 and partially protruding out of the rectangular opening 118. The volume knob 119 is electrically connected to a circuit board (not shown) of the keyboard 10.

The input keys 12 include standard keyboard keys 121 and standard telephone keys 122. The standard telephone keys 122 include a switchhook key 1221 and an enable phone key 1222. The switchhook key 1221 facilitates as a phone hook to answer or hang up a call. The enable phone key 1222 is configured for changing a subset of the standard keyboard keys 121. In this embodiment, the enable phone key 1222 adopts the numerical keys of the standard keyboard keys 121 as numerical keys of a telephone. Thus, the numerical keys of the standard keyboard keys 121 can be used as phone keys.

Figure 3:
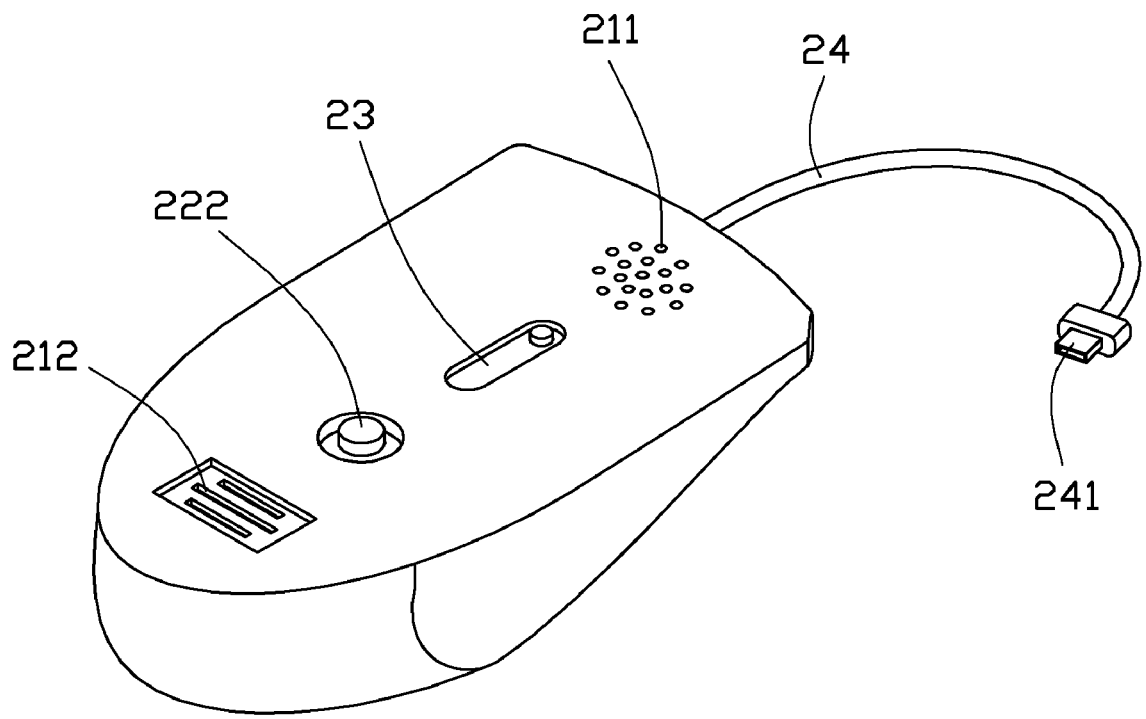
FIG. 3 is a mouse of the computer input apparatus of FIG. 1, but viewed at another angle.

Referring to FIGS. 1, 3, the mouse 20 includes a main body 21, a number of buttons 22 mounted on the main body 21, a motion detecting unit 23, and a cable 24 with one end connecting to the main body 21. The main body 21 includes a mouse speaker 211 near the cable and a mouse microphone 212 on the far side from the cable 24. The mouse speaker 211 is configured for converting electrical signals to sound. The mouse microphone 212 is configured for converting sound into electrical signals. The buttons 22 include a number of standard mouse buttons 221 and an enable telephone button 222. The standard mouse buttons 221 include a left button 2211, a right button 2212, and a scroll wheel 2213 between the left button 2211 and the right button 2212. The enable telephone button 222 is configured for enabling a telephone function of the mouse 20 to answer a call. The enable telephone button 222 is mounted in the bottom surface of the main body 21 between the mouse speaker 211 and the mouse microphone 212. The motion detecting unit 23 is configured for detecting the motion of the mouse 20 and translating the motion into the motion of a cursor on a display (not shown). The cable 24 is configured for data/signal transmission. The cable 24 includes a USB plug 241 on the end of cable 24 away from the main body 21. The USB plug 241 can be coupled with the USB connector 114 of the keyboard 10.

Figure 4:
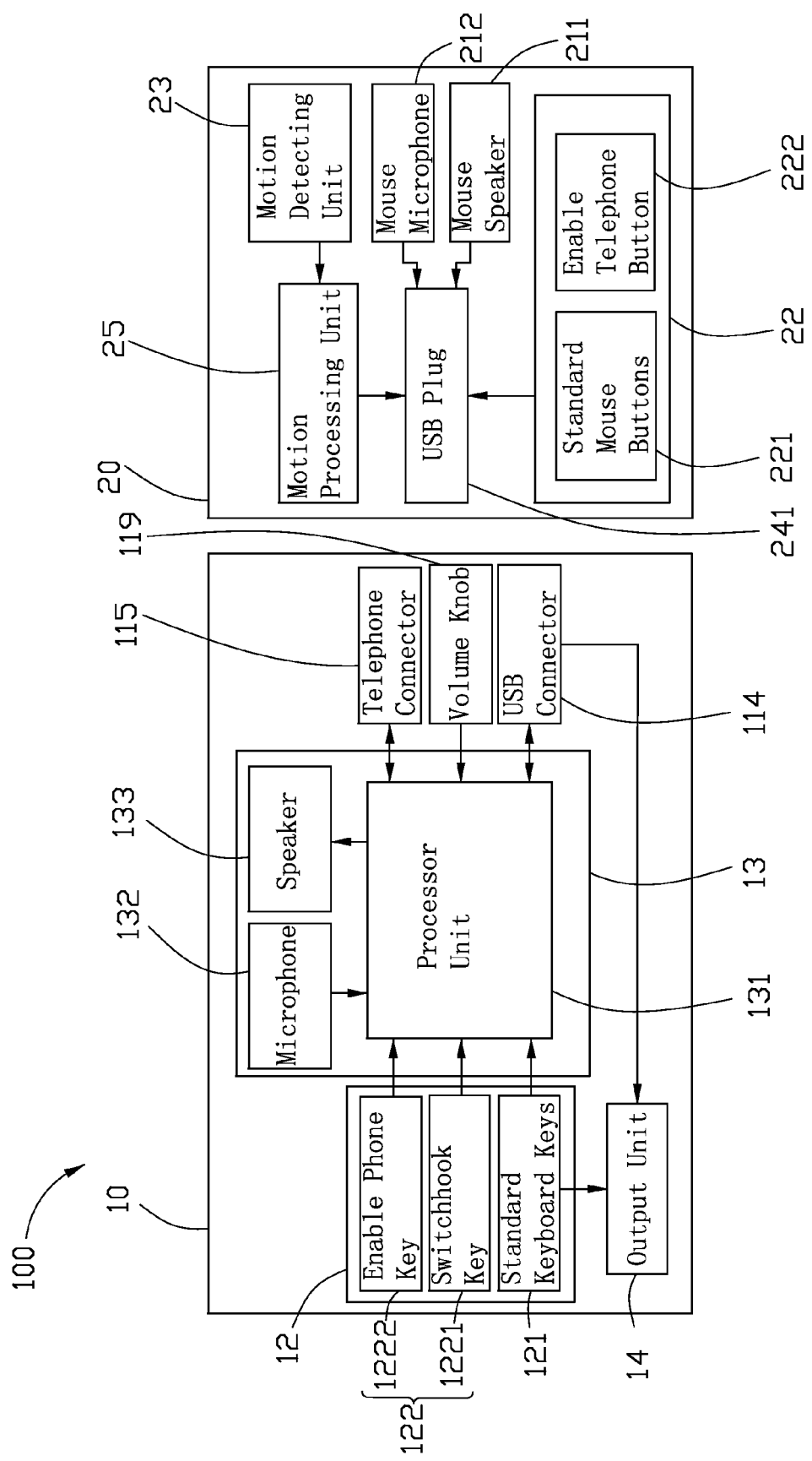
FIG. 4 is a functional block diagram of the computer input apparatus of FIG. 1.

Further referring to FIG. 4, a functional block diagram of the input apparatus 100 is shown. The keyboard 10 further includes a telephone module 13 connected to the telephone connector 115 and an output unit 14 therein.

The telephone module 13 includes a processor unit 131, a microphone 132, and a speaker 133. The processor unit 131 is configured for processing an incoming call or making a call according to a user input. In detail, when receiving an incoming call, the processor unit 131 sends a ring signal to the speaker 133. Then, the speaker 133 outputs audible sound to alert of the incoming call. In other embodiments, the telephone unit 131 also can send a remind signal to a vibrator or a lighting unit (not shown) to alert of the incoming call via vibration or visual light respectively. If the switchhook key 1221 is actuated, the processor unit 131 answers or hang up a call. When dialing a call, first, the processor unit 131 adopts the numerical keys as phone keys to receive phone key inputs after the input keys 12 is actuated, and performs phone functions according to the phone key inputs.

The processor unit 131 is also configured for processing the incoming signals of a call and input signals from the microphone 132 and the volume knob 119. The signal processing of the processor unit 131 may includes wave filtering processing, noise reduction processing, and power amplifying processing, etc. Thus, the processor unit 131 can respond to volume signals inputted by the volume knob 119 and adjust the volume of the speaker 133 based on the volume signals.

The microphone 132 is positioned in the housing 11 of the keyboard 10 adjacent to the microphone sound holes 116. The microphone 132 is configured for converting sound into electrical signals and sending the electrical signals to the processor unit 131.

The speaker 133 is positioned in the housing 11 of the keyboard 10 adjacent to the speaker sound holes 117. The speaker 133 is configured for converting electrical signals to sound.

The output unit 14 is electrically connected to the standard keyboard keys 121 and the USB connector 114. The output unit 14 is configured for transmitting the input information of the keyboard 10 and/or the mouse 20.

The mouse 20 further includes a motion processing unit 25 electrically connected to the USB plug 241. The motion processing unit 25 is configured for processing the detection of the motion detecting unit 23 and outputting processed motion signals to a host (not shown) through the USB plug 241.

If a call is incoming, the user can answer the call through the keyboard 10 or through the mouse 20 by the operating the enable telephone button 222.

The input apparatus 100 integrates a telephone, speaker, and a microphone to the keyboard 10 and the mouse 20, respectively. Thus, saving tabletop space. Also, an independent connection of a telephone is omitted too.

It is believed that the present embodiments and their advantages wills be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A computer input apparatus, comprising:
    a keyboard, comprising:
        a housing;
        a number of input keys arranged on the housing comprising standard keyboard keys and standard telephone keys;
        a lighting unit disposed in the housing; and
        a telephone module in the housing configured for responding to an incoming call or making an outgoing call according to a user's input by operating the input keys, and configured for sending a reminding signal to the lighting unit to alert of an incoming call via visual light; and
    a mouse, comprising:
        a main body comprising a mouse speaker configured for converting electrical signals into sound and a mouse microphone configured for converting sound into electrical signals;
        a plurality of buttons mounted on the main body, comprising a plurality of standard mouse buttons and an enable telephone button configured for enabling a telephone function of the mouse to answer a call; and
        a motion detecting unit configured for detecting the motion of the mouse and translating the motion into the motion of a cursor.

2. The computer input apparatus as claimed in claim 1, wherein the housing comprises a first side surface, a second side surface parallel to the first side surface, and a third side surface connecting to the first side surface and the third surface.

3. The computer input apparatus as claimed in claim 2, wherein the housing defines a universal serial bus (USB) connector and a telephone connector in the first side surface, a number of microphone sound holes in the second side surface and, a number of speaker sound holes and a rectangular opening in the third side surface.

4. The computer input apparatus as claimed in claim 3, wherein the housing comprises a volume knob rotatably positioned in the rectangular opening and partially protruding out of the rectangular opening, and the volume knob is electrically connected to the telephone module in the housing.

5. The computer input apparatus as claimed in claim 4, wherein the standard telephone keys comprise a switchhook key and an enable phone key, the switchhook key facilitates as a hook to answer or hang up a call, and the enable phone key is configured for changing a subset of the standard keyboard keys.

6. The computer input apparatus as claimed in claim 5, wherein the enable phone key adopts the numerical keys of the standard keyboard keys into numerical keys of a telephone.

7. The computer input apparatus as claimed in claim 3, wherein the telephone module comprises a processor unit, a microphone, and a speaker, the processor unit is configured for processing an incoming call or making a call according to a user input, the microphone is positioned in the housing of the keyboard adjacent to the microphone sound holes and configured for converting sound into electrical signals and output the electrical signals to the processor unit, and the speaker is positioned in the housing of the keyboard adjacent to the speaker sound hole and configured for converting electrical signals to sound.

8. The computer input apparatus as claimed in claim 7, wherein the processor unit is also configured for processing the incoming signals of a call and input signals from the microphone and the volume knob.

9. The computer input apparatus as claimed in claim 8, wherein the signal processing of the processor unit comprises wave filtering processing, noise reduction processing, and power amplifying processing.

10. The computer input apparatus as claimed in claim 3, wherein the mouse further comprises a cable for data/signal transmission, the cable comprises a USB plug on the end of the cable away from the main body, and the USB plug is connected to USB connector of the keyboard.

11. The computer input apparatus as claimed in claim 1, wherein the standard mouse buttons comprise a left button, a right button, and a scroll wheel between the left button and the right button.

12. The computer input apparatus as claimed in claim 11, wherein the enable telephone button is mounted in the bottom surface of the main body between the mouse speaker and the mouse microphone.

\* \* \* \* \*